United States Patent [19]

Ewen et al.

[11] Patent Number: 4,667,009

[45] Date of Patent: May 19, 1987

[54] POLYMETHYLENE POLYPHENYLAMINE MODIFIED DIAMINE CHAIN EXTENDERS IN POLYUREA ELASTOMERS

[75] Inventors: James H. Ewen, Seabrook; John O. Guerrero, LaPorte, both of Tex.

[73] Assignee: The Dow Chemical Company, Midland, Mich.

[21] Appl. No.: 780,115

[22] Filed: Sep. 25, 1985

[51] Int. Cl.$^4$ .................. C08G 18/10; C08G 18/32; C09K 3/00

[52] U.S. Cl. ........................................ 528/68; 252/182

[58] Field of Search ........................... 528/68; 252/182

[56] References Cited

U.S. PATENT DOCUMENTS

| | | | |
|---|---|---|---|
| 4,048,105 | 9/1977 | Salisbury | 260/2.5 AC |
| 4,218,543 | 8/1980 | Weber et al. | 521/51 |
| 4,269,945 | 5/1981 | Vanderhider et al. | 521/159 |
| 4,296,212 | 10/1981 | Ewen et al. | 521/163 |
| 4,374,210 | 2/1983 | Ewen et al. | 521/159 |
| 4,433,067 | 2/1984 | Rice et al. | 521/51 |
| 4,444,910 | 4/1984 | Rice et al. | 521/51 |
| 4,448,904 | 5/1984 | Dominguez | 521/160 |
| 4,530,941 | 7/1985 | Turner et al. | 521/176 |

FOREIGN PATENT DOCUMENTS 1534258  11/1978  United Kingdom .

*Primary Examiner*—Herbert S. Cockeram
*Attorney, Agent, or Firm*—J. S. Rose

[57] ABSTRACT

Reaction injection molded polyurea elastomers are disclosed that are derived from the reaction of (1) an aromatic polyisocyanate; (2) primary or secondary amine terminated polyethers; and (3) an aromatic amine extender combination comprising (a) an aromatic diamine having at least one of the positions ortho to each amine group substituted by a lower alkyl group and (b) a polymethylene polyphenylamine.

The use of the polymethylene polyphenylamine component allows for the retention of the good physical properties of the prior art polyureas while at the same time effecting a cost reduction in the preparation of this useful class of polymers.

16 Claims, No Drawings

POLYMETHYLENE POLYPHENYLAMINE MODIFIED DIAMINE CHAIN EXTENDERS IN POLYUREA ELASTOMERS

FIELD OF THE INVENTION

This invention relates to polyurea elastomers and is more particularly concerned with reaction injection molded (RIM) polyurea elastomers and with the aromatic amine extender combinations and polyamine blends employed in the preparation of said elastomers.

DESCRIPTION OF THE PRIOR ART

Polyurethane-polyurea polymers are well known in the art. U.S. Pat. No. 4,218,543 provides a comprehensive review of the prior art relating to the preparation of polyurethane-polyureas by the RIM processing of organic polyisocyanates, polymeric polyols, and various polyamine extenders particularly of the type exemplified by diethyl toluene diamine (DETDA). Improvements in the production of elastomeric polyurethane-polyurea polymers by the RIM technique have been reported in U.S. Pat. No. 4,296,212 and 4,374,210 which disclose the use of extender blends of diamines with glycols and the use of isocyanate terminated prepolymers respectively.

British Patent No. 1,534,258 which is equivalent to U.S. Pat. No. 4,218,543 cited supra discloses any active aromatic diamine or higher polyamine useful as amine extenders. In addition to the DETDA type diamines of its U.S. counterpart, diamines such as 4,4'-diaminodiphenylmethane, liquid mixtures of polyphenyl polymethylene polyamines, and mixtures of any of the types of polyamines are disclosed. Preferred are the DETDA type diamines and no specific mixtures or examples disclosing mixtures appear in the reference.

U.S. Pat. No. 4,048,105 discloses the preparation of polyurethane RIM products derived from polyols, methylenepoly(phenylamines), and, optionally, alkylene diols or triols.

Recently, U.S. Pat. No. 4,433,067 disclosed that the replacement of the polymeric polyol component of amine extended RIM prepared polyurethane-polyureas resulted in polyurea polymers having improved heat resistance.

In all of the prior art RIM prepared polyurea elastomers, the preferred aromatic diamine extenders have been of the sterically hindered DETDA type. Such formulations, while providing elastomers of high quality suffer from certain drawbacks: first the DETDA type amines are expensive, and secondly, the isocyanate component is limited to relatively high purity p,p'-methylenebis(phenyl isocyanate) in order to achieve optimum physical properties. While it has been shown that the use of a methylenebis(phenyl isocyanate) high in o,p'-isomer content can be tolerated in an all polyurea elastomer (see U.S. Pat. No. 4,448,904) optimum properties are still obtained with the isocyanate highest in p,p' purity.

We have now discovered a class of RIM polyurea elastomers wherein a portion of the DETDA type amine extender has been replaced by a polymethylene polyphenylamine component. The use of the polymethylene polyphenylamine substantially reduces the overall cost of the present polymers with no loss in properties over the prior art material. In fact, in some instances polymer property improvements can be achieved through the use of the polymethylene polyphenylamine extender component. Additionally, methylenebis(phenyl isocyanate) components high in o,p'-isomer content can be employed with no loss in resultant polymer properties.

SUMMARY OF THE INVENTION

This invention comprises improved reaction injection molded polyurea elastomers prepared by the reaction of an aromatic polyisocyanate, an amine terminated polyether and an aromatic diamine extender wherein at least one of the positions ortho to each amine group of said diamine is substituted by a lower alkyl group, wherein the improvement comprises employing in combination with said aromatic diamine as an additional amine extender a polymethylene polyphenylamine having the formula (I) (see FORMULA CHART below) wherein n has an average value of from about 0.1 to about 0.7, and X is selected from the group consisting of hydrogen, halogen, and lower-alkyl.

This invention also comprises the process of preparing the polyurea elastomers by the reaction injection molding method.

This invention also comprises aromatic amine extender combinations comprising (a) said aromatic diamine and (b) said polymethylene polyphenylamine both referred to above in the RIM preparation of the polyurea elastomers in accordance with the present invention.

This invention also comprises polyamine blend compositions for the preparation of the polyurea elastomers in accordance with the present invention comprising (i) at least one amine terminated polyether and (ii) said aromatic amine extender combination (a) and (b) described above.

The term "aromatic diamine" means an aromatic diamine obtained by replacing two nuclear hydrogen atoms of an aromatic hydrocarbon by $-NH_2$ groups said aromatic hydrocarbon having from 6 to 12 aromatic carbon atoms, inclusive, and is inclusive of phenylene, tolylene, naphthylene, and aromatic diamines having the formula (II) (see FORMULA CHART) wherein Y is selected from the group consisting of a single bond, $-SO_2-$,

$-O-$, and lower-alkylene from $C_1$ to $C_4$.

The term "halogen" means fluorine, chlorine, bromine, or iodine.

The term "lower-alkyl" means alkyl having from 1 to 4 carbon atoms, inclusive, such as methyl, ethyl, propyl, butyl, and isomeric forms thereof.

The term "amine terminated polyether" means a primary or secondary amine terminated polyether having a number average molecular weight greater than about 1500 wherein the primary or secondary amine functionality is from about 2 to about 6.

DETAILED DESCRIPTION OF THE INVENTION

The improved RIM polyurea elastomers of the invention can be prepared using any of the RIM procedures, apparatus, and appropriate ingredients set forth in the prior art. For illustrative and detailed teaching in this regard see U.S. Pat. No. 4,218,543, 4,296,212, 4,374,210 and 4,433,067 cited supra whose disclosures are hereby incorporated herein by reference.

The ingredients employed can be any of the aromatic polyisocyanates, amine terminated polyethers, and sterically hindered aromatic diamine extenders which are illustratively disclosed in U.S. Pat. No. 4,433,067 cited supra and already incorporated herein by reference.

The novelty in the present invention resides in the replacement of up to 50 percent by weight of the aromatic diamine extender of the prior art with the polymethylene polyphenylamine of formula (I) defined above which provides for the particular novel aromatic amine extender combinations of (a) and (b) also defined above. Advantageously, the extender combination comprises (a) from about 99 percent to about 50 percent by weight of said aromatic diamine and (b) from about 1 to about 50 percent of said polymethylene polyphenylamine. Preferably (a) is from about 95 to about 70 percent and (b) from about 5 to about 30 percent by weight.

Components (a) and (b) may be brought together at the time of the RIM preparation of the elastomers. Optionally, they may be employed as an embodiment of the present invention as a premixed liquid blend. The components are mixed or blended together to form a liquid aromatic amine extender combination which may be handled as such for transportation or for indefinite storage prior to use. Both components can be liquids prior to their being blended and thereby easily soluble in each other. In the event that either one may be a low melting solid, which is more apt to occur with the polymethylene polyphenylamine component, a liquid blend is easily obtained by mixing them together at ambient room temperature (i.e. about 20° C.) or at a slightly elevated temperature (for example, about 30° C. to about 100° C.) to facilitate the solution of one in the other, preferably to the exclusion of air.

The diamines include any of those disclosed in the art cited supra which fall within the definition set forth above and having a molecular weight range of about 135 to about 450. Preferably, all of the ortho positions to each amino group are substituted by a lower-alkyl group.

Illustrative but not limiting of the aromatic diamines are 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene (and mixtures of the latter two diamines in varying proportions), t-butylbenzenediamine, and the like; 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, and the like; 3,3',5,5'-tetramethyl-benzidine, 3,3',-3,3',5,5'-tetraisopropyl-benzidine, and the like; 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2', 4-diaminodiphenylmethane, 3,5-diisopropyl-3'-methyl-2', 4-diaminodiphenylmethane, 3,3'-diethyl-2,2'-diaminodiphenylmethane, and the like; 3,3',5,5'-tetraethyl-4,4'-diaminobenzophenone, 3,3',5,5'-tetraisopropyl-4,4'-diaminobenzophenone; 3,3',5,5'-tetraethyl-4,4'-diaminodiphenyl ether, 3,3',5,5'-tetraisopropyl-4,4'-diaminodiphenylether; 3,3',5,5'-tetraisopropyl-4,4'-diaminodiphenyl sulfone, and the like; and the products obtained by condensing a substituted aniline of the formula (III) or a mixture of two or more such substituted anilines, with formaldehyde under acid conditions to obtain substituted diaminodiphenylmethanes having the formula (IV) wherein $R_1$ and $R_3$ are selected from hydrogen and lower-alkyl and $R_2$ and $R_4$ are lower-alkyl. If one uses only a single substituted aniline (III) to prepare (IV) the groups $R_1$ and $R_3$ will be identical and so will $R_2$ and $R_4$. If one uses two differently substituted anilines in the above reaction the product will be a mixture of a number of different methylenedi(anilines) all conforming to the formula (IV).

A preferred group of diamines comprises 1-methyl-3,5-diethyl-2,4-diaminobenzene, 1-methyl-3,5-diethyl-2,6-diaminobenzene, and mixtures thereof in varying proportions, 1,3,5-triethyl-2,4-diaminobenzene, 3,3',5,5'-tetraisopropyl-4,4'-diaminodiphenylmethane, and tertiary-butylbenzenediamine.

Most preferred amongst the diamines set forth above are 1-methyl-3,5-diethyl-2,4-diaminobenzene, 1-methyl-3,5-diethyl-2,6-diaminobenzene, and mixtures thereof in varying proportions (generally known as DETDA).

The polymethylene polyphenylamine component (b) defined by formula (I) is inclusive of a wide variety of blends of varying amine functionalities and isomer variations all of which can be employed in the present invention. The preferred polyamines are those wherein X is hydrogen and n has an average value of from about 0.25 to about 0.35.

It will be readily understood by those skilled in the art that when the average value of n is at its lowest, the concentration of the difunctional methylenedianiline component of the mixture is at its highest level and vice versa. Although methylenedianiline can be employed as the component (b) in accordance with the present invention, it is preferred to use the mixture defined by formula (I) wherein n has an average value of at least about 0.1, and, preferably, from about 0.25 to about 0.35.

Accordingly, the polymethylene polyphenylamines comprise from about 20 percent to about 95 percent by weight of methylenedianiline with the remainder comprising polymethylene polyphenylamines of functionality higher than 2.0. Preferably, the methylenedianiline concentration in the mixture is from about 25 to about 85 percent by weight.

In respect of the isomers which can be present in the mixtures, the present invention comprehends all the isomer variation in which the polymethylene polyphenylamines can be obtained. That is to say, formula (I) includes those mixtures wherein the methylenedianiline is the 4,4'-isomer, the 2,4'-isomer, or mixtures of these two in varying proportions. Also, there can be included minor proportions of the 2,2'-isomer. It will be recognized that the corresponding isomer variations apply to the higher amine functionality components present in the mixtures.

In respect of the amine terminated polyether components defined above they are preferably primary amine terminated polyethyleneoxy-polypropyleneoxy polyethers having a functionality of about 2 to about 4 and molecular weight from about 2000 to about 8000. Most preferred are those having primary amine groups and functionalities falling within the range of about 2 to about 3. For detailed teaching in regard to these amine terminated polyethers and their preparation see U.S.

Pat. No. 4,433,067 cited supra whose disclosure is already incorporated herein.

Generally speaking, the proportions of the amine terminated polyether components employed [hereinafter component (i)], relative to the proportion of the novel aromatic amine extender combinations described above [hereinafter component (ii)], control the soft and hard segment contents of the resulting polyureas. The terms "soft and hard segments" refer to the linkages derived from the polyisocyanate component with the high molecular weight amine terminated polyether and with the extender combination respectively.

The relative proportions of (i) and (ii) can vary depending on the hard segment content desired which latter ultimately controls polymer properties such as tensile modulus, heat resistance, and the like. Generally speaking, the higher the hard segment content the higher the modulus properties of the resulting polymers. Accordingly, it is a simple matter to determine the necessary proportions of (i) and (ii) in order to meet a desired set of physical properties for the products of this invention.

Advantageously, the component (i) can be employed in an amount falling within about 80 percent to about 55 percent by weight based on the total weight of (i) and (ii) with (ii) being present in the range of about 20 percent to about 45 percent by weight. Preferably, (i) and (ii) are employed in the amounts falling within about 75 to about 60 percent and about 25 to about 40 percent respectively, most preferably about 70 to about 65 percent and about 30 to about 35 percent respectively.

The amine terminated polyethers (i) may be brought together at the RIM mixing head with the other reactants when the polyureas are being prepared. In an optional embodiment they can be mixed with the extender combination to form the novel liquid polyamine blends comprising (i) and (ii) in the proportions described above.

Advantageously, the liquid polyamine blends can be stored, transported, pumped and otherwise employed as a B component for reaction with the polyisocyanate or A component during the RIM reaction. The RIM preparation of the present polyureas is not in any way limited to the use of only two reactant streams A and B, however, the fact that all of the active hydrogen containing components can be so easily employed as a stable liquid preblend makes the two stream method particularly preferred.

One of the additional and unexpected benefits to flow from the polyamine blends of the invention is the fact that the concentration of either one of the aromatic amine extenders can be varied within the blend of (i) and (ii) to control the resultant elastomer properties without appreciably affecting overall blend equivalent weight. This advantage arises because the (a) and (b) parts of (ii) can be purposely selected to have similar amine equivalent weights. Accordingly, having once settled on an optimum A:B weight or volume ratio of components in the RIM process, the B component can have its ingredients altered without much overall effect on the A:B ratios.

While the primary extenders in the present polymers are the aromatic amine components (a) and (b), it is within the scope of this process to include minor amounts (up to about 20 percent by weight) of extender diols of molecular weight of about 60 to about 400. Illustratively, the extender diols are ethylene glycol, 1,4-butanediol, 1,6-hexanediol, diethylene glycol, polyethylene glycol of molecular weight about 200, and the like.

The aromatic polyisocyanates to be used in accordance with the present invention can be any of the di- or higher functionality polyisocyanates known to those skilled in the RIM art and include those polyisocyanates disclosed in the patents incorporated herein by reference.

Illustrative, but not limiting thereof, are m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 20 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality of 2 to 3 selected from polyalkyleneoxy polyols of MW 1000 to 10,000, polytetramethylene glycols of MW 600 to 5000, and polyester polyols of MW 500 to 8000, said polyol and said methylenebis(phenyl isocyanate) being reacted in the proportions of about 0.01 equivalent to about 0.5 equivalent of said polyol per isocyanate equivalent in accordance with U.S. Pat. No. 4,374,210 whose disclosure is already incorporated herein; falling within a preferred group of polyisocyanates are the isocyanate terminated prepolymers having an isocyanate content of about 9 to about 20 percent by weight; the liquefied methylenebis(phenyl isocyanates); and mixtures of these types.

The proportions of polyisocyanate to the total active hydrogen equivalents comprised of the amine terminated polyether and the amine extender combination are such that the ratio of isocyanate equivalents to the total active hydrogen equivalents falls within a range of from about 0.95 to about 1.15, preferably from about 0.98 to about 1.05.

The temperature of the RIM mold during the shot is not critical and can fall within the range of from about 40° to about 250° C. Preferably, the mold is held at from about 80° C. to about 250° C.

Optionally, a catalyst for the reaction of isocyanate groups with the reactive hydrogen containing compounds may be employed. Any of the catalysts disclosed in the art supra can be employed in the present process. Such catalysts include organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isooctylthioglycolate), and the like; triethylamine, triethylenediamine, N,N,N',N'-tetramethylethylenediamine, N-methylmorpholine, N,N-dimethylcyclohexylamine, and the like, and mixtures of the above in any combination.

Generally speaking, the catalyst or mixture of catalysts, if employed, will fall within a range of from about 0.01 percent by weight to about 5 percent by weight based on the total weight of all the ingredients.

Optionally, blowing agents may be employed wherein compact tough skinned surfaces are desired. Any of the blowing agents known in the art can be used including water and the fluorocarbon blowing agents. Also, inert gases (e.g. nitrogen, argon, and the like) may be introduced to provide whatever degree of blowing is desired from micro-cellular to macro-cellular in nature.

Other optional additives such as dispersing agents, cell stabilizers, surfactants, internal mold release agents, flame retardants, colorants, reinforcing agents, fiber glass, and the like can be added to the RIM ingredients in accordance with the present process.

The polymers produced in accordance with the present invention are possessed of the combination of excellent physical properties such as high tensile strength, hardness, heat resistance, high flex modulus, good impact strength, and the like.

Generally speaking, the polymers are characterized by a flexural modulus falling within the range of from about 10,000 to about 200,000 psi when measured at ambient temperature (about 20° C.) in accordance with the ASTM Test Method D-790.

In addition to the advantages relating to the use of the extender amine mixture in the present polyureas already discussed above, there are other benefits which would not be expected. These benefits include the use of a relatively high concentration of the polymethylene polyphenylamine component before its increased reactivity begins to cause a more rapid gelation than the prior art polyurea formulations. The shrinkage of the presently molded parts is less than the prior art moldings. Tensile modulus improvements are observed. However, of prime importance is the variety of properties obtainable in the polyurea elastomers along with the flexibility of processing which are the result of the present aromatic extender blends. Added to these advantages is the fact that the cost of the present extender packages, and, thus the polyureas themselves, are greatly reduced over those of the prior art.

Accordingly, the present polymers are useful for the preparation of solid RIM elastomers, solid and microcellular RIM elastomers, and elastoplastics, all within a Shore D hardness range of from about 30 to about 80. The molded products find particular utility as auto parts such as car bumpers, body elements, panels, doors, engine hoods, skirt air scoops, and the like. The high heat resistance of the molded parts allows for them to be painted on-line in an automotive assembly application.

The following examples describe the manner and process of making and using the invention and set forth the best mode contemplated by the inventors of carrying out the invention but are not to be construed as limiting.

EXAMPLE 1

The following experiment describes the RIM preparation of a series of polyurea elastomers; runs 1a through 1c in accordance with the present invention and comparison runs 1a through 1c in accordance with the prior art. An Admiral 2000-2HP RIM machine (Admiral Equipment Co., Division of The Dow Chemical Company) was employed along with the ingredients, in the proportions in parts by weight set forth in Table I. One tank of the RIM machine was charged with the A component or polyisocyanate (at about 100° F.).

Polyamine blends in accordance with the present invention (for runs 1a to 1c) were prepared by mixing the ingredients, in the proportions in parts by weight set forth in Table I under Component B, in a clean dry 55 gallon drum using a drum roller (5 to 10 rpm). Atmospheric steam was used to facilitate the melting and dissolution of the polymethylene polyphenylamine component in the other liquid ingredients. The B tank of the RIM machine was charged with the liquid polyamine blends (at about 100° F.).

Metering pumps from each tank were used to deliver the components into the impingement mixing head. After mixing, the reaction mixture was directed into metal molds measuring 23 inches × 38 inches × 0.125 inch using a mold temperature of 90° C. The resultant polyurea elastomer sheets were postcured at 250° F. for one hour before the physical properties set forth in Table I were determined.

A comparison of the physical properties of the comparison 1a to 1c samples with those of the 1a to 1c samples of the invention shows a retention of properties in the latter three runs, and, in fact, at the higher NCO/NH index (i.e. 1c) the modulus properties exceed those values for the comparison runs while maintaining the same heat sag values. Additionally, there is an improvement in tensile modulus values of the 1a to 1c runs over the comparisons. Most importantly, all the molds were completely filled in the 1a to 1c runs before gelation notwithstanding the presence of the more reactive polyphenylamine component. Under a given set of reaction conditions, the extent of filling of the RIM mold before gelation occurs is an indirect measure of gelation given the mold volume and output of the RIM machine. In this respect the 1a to 1c formulations had reaction speeds or gel times no different from the control runs which did not contain the highly reactive polyphenylamine.

TABLE I

| Run | Comparison 1a | Comparison 1b | Comparison 1c | 1a | 1b | 1c |
| --- | --- | --- | --- | --- | --- | --- |
| Ingredients (parts by wt.) | | | | | | |
| Component A: Isocyanate I[1] | 68.1 | 73.2 | 76.9 | 72.7 | 76.4 | 80.0 |
| Component B: | | | | | | |
| T-5000[2] | 69.64 | → | → | 67.71 | → | → |
| DETDA[3] | 29.21 | → | → | 28.40 | → | → |
| C-116[4] | — | — | — | 0.48 | → | → |
| Q27119[5] | 1.15 | → | → | 2.43 | → | → |

TABLE I-continued

| Run | Comparison 1a | Comparison 1b | Comparison 1c | 1a | 1b | 1c |
|---|---|---|---|---|---|---|
| L-5304[6] | 1.00 | → | → | 0.97 | → | → |
| NCO/NH$_2$ Index | 0.93 | 1.00 | 1.05 | 1.00 | 1.05 | 1.10 |
| % Hard Segment | 49.45 | 49.45 | 49.45 | 49.80 | 49.80 | 49.80 |
| Properties | | | | | | |
| Density, gr/cc | 1.07 | 1.07 | 1.07 | 1.06 | 1.06 | 1.07 |
| Hardness, Shore D | 68 | 68 | 68 | 66 | 68 | 68 |
| Tensile str. (psi) | 5000 | 5200 | 5300 | 4900 | 5500 | 5000 |
| Tensile Modulus (psi) | | | | | | |
| 100% | 3200 | 3400 | 3800 | 3500 | 4050 | 3900 |
| 200% | 4100 | 4500 | 5000 | 4300 | 5200 | — |
| Elongation (%) | 280 | 250 | 220 | 240 | 220 | 175 |
| Die "C" Tear, (pli)[7] | — | — | — | 920 | 920 | 910 |
| Heat Sag (in.)[8] | 0.2 | 0.1 | 0.1 | 0.4 | 0.2 | 0.1 |
| Flexural Modulus (psi) | | | | | | |
| −20° F. | 147,891 | 148,137 | 150,169 | 144,782 | 161,000 | 160,300 |
| RT (68° F.) | 68,415 | 73,196 | 76,177 | 73,931 | 75,187 | 74,233 |
| 158° F. | 52,111 | 53,884 | 54,196 | 51,000 | 56,700 | 55,000 |
| % Shrinkage | — | 1.87 | — | — | — | — |

Footnotes to Table I
[1]Isocyanate I: is a blend in the proportions by weight of (1) 9.88 parts of a liquefied form of 4,4'-methylenebis(phenyl isocyanate) in which a portion of the isocyanate groups have been converted to carbodiimide (I.E. = 143); and (2) an isocyanate terminated prepolymer prepared from the reaction of about 67.77 parts of a methylenebis(phenyl isocyanate) comprising about 15% o,p' and about 85% of the p,p'-isomer with 13.95 parts of a 5000 molecular weight polypropyleneoxy-polyethyleneoxy triol and 8.40 parts of a 50/50 (by wt.) mixture of dipropylene glycol and tripropylene glycol; I.E. of Isocyanate I = about 201; free NCO = about 20 percent by wt.
[2]T-5000: is a trifunctional polypropyleneoxy polyamine of about 5000 molecular weight wherein at least 50% of its functionality are primary amine groups (supplied by Texaco Chemical).
[3]DETDA: a mixture of about 80/20 by weight of 1-methyl-3,5-diethyl-2,4-diaminobenzene and 1-methyl-3,5-diethyl-2,6-diaminobenzene.
[4]C-116: is a polymethylene polyphenylamine in accordance with formula (I) defined above wherein X is hydrogen, n has an average value of about 0.3 and the methylene-dianiline content is about 70 percent by wt. (supplied by the Dow Chemical Company).
[5]Q27119: is a dimethyl siloxane containing organic acid and is an internal release agent (supplied by Dow Corning Corp.).
[6]L-5304: is a silicone oil surfactant (supplied by Union Carbide Corporation).
[7]Die "C" Tear: performed in accordance with ASTM Test Method C273.
[8]Heat Sag: is determined by measuring the amount in inches that a 1 inch wide sample (about ⅛ inch thick), with a 6" unsupported overhang, droops under its own weight when held at one end in a horizontal position at a temperature of 250° F. for 60 minutes.

EXAMPLE 2

Using the same apparatus and procedure described in Example 1 but with the ingredients in the proportions in parts by weight set forth below in Table II there were prepared six polyurea elastomers in accordance with the present invention (runs 2a to 2c and 3a to 3c).

These polyurea samples have an even higher proportion of the aromatic diamine extender component (DETDA) replaced by the polymethylene polyphenylamine compared with runs 1a to 1c yet the physical properties of the elastomers are maintained at values comparable to the comparison runs of Example 1.

The shrinkage of the molded parts as measured for runs 2b and 3b were observed to be less than in the comparison 1b of Example 1. It should be noted that the differences between these observed values in shrinkage represents a significant one. In all the runs the molds filled completely prior to gelation occurring, notwithstanding the higher concentrations of the polyphenylamine over Example 1.

TABLE II

| Run | 2a | 2b | 2c | 3a | 3b | 3c |
|---|---|---|---|---|---|---|
| Ingredients (parts by wt.) | | | | | | |
| Component A: Isocyanate I | 73.4 | 77.1 | 80.7 | 74.6 | 78.3 | 82.1 |
| Component B: | | | | | | |
| T-5000 | 67.38 | → | → | 66.74 | → | → |
| DETDA | 28.26 | → | → | 27.99 | → | → |
| C-116 | 0.97 | → | → | 1.92 | → | → |
| Q27119 | 2.42 | → | → | 2.39 | → | → |
| L-5304 | 0.97 | → | → | 0.96 | → | → |
| NCO/NH$_2$ Index | 1.00 | 1.05 | 1.10 | 1.00 | 1.05 | 1.10 |
| % Hard Segment | 49.75 | 49.75 | 49.75 | 50.41 | 50.41 | 50.41 |
| Properties | | | | | | |
| Density, gr/cc | 1.07 | 1.04 | 1.06 | 1.01 | 1.02 | 1.01 |
| Hardness Shore D | 66 | 67 | 68 | 66 | 68 | 67 |
| Tensile str. (psi) | 4200 | 5000 | 5000 | 4800 | 4800 | 4980 |
| Tensile Modulus (psi) | | | | | | |
| 100% | 3600 | 3700 | 3800 | 3350 | 3600 | 3900 |
| 200% | — | 4667 | 4600 | — | 4500 | 4950 |
| Elongation (%) | 190 | 230 | 220 | 197 | 210 | 210 |
| Die "C" Tear (pli) | 860 | 850 | 890 | 830 | 835 | 850 |
| Heat Sag (in.) | 0.3 | 0.2 | 0.2 | 0.3 | 0.3 | 0.1 |
| Flexural Modulus (psi) | | | | | | |
| −20° F. | 153,162 | 150,000 | 158,000 | 147,000 | 145,000 | 152,389 |

TABLE II-continued

| Run | 2a | 2b | 2c | 3a | 3b | 3c |
|---|---|---|---|---|---|---|
| RT (68° F.) | 76,243 | 77,239 | 81,547 | 67,000 | 70,505 | 70,478 |
| 158° F. | 55,320 | 55,284 | 57,000 | 50,000 | 57,000 | 47,000 |
| % Shrinkage | — | 1.56 | — | — | 1.56 | — |

EXAMPLE 3

Using the same apparatus and procedure described in Example 1 but with the ingredients in the proportions in parts by weight set forth below in Table III there were prepared six polyurea elastomers in accordance with the present invention (runs 4a to 4c and 5a to 5c).

These polyurea samples have even higher proportions of the polymethylene polyphenylamine replacing the aromatic diamine extender compared with those of Example 2. Similarly to the samples of Example 2, they exhibit significantly less shrinkage than the comparison samples set forth in Example 1. Further, the flexural modulus properties are superior to those of the comparison materials and the heat sag values are excellent regardless of the NCO/NH$_2$ index. In all the runs the molds filled completely prior to gelation occurring in spite of the increased levels of polyphenylamine over Example 2.

TABLE III

| Run | 4a | 4b | 4c | 5a | 5b | 5c |
|---|---|---|---|---|---|---|
| Ingredients (parts by wt.) | | | | | | |
| Component A: Isocyanate I | 78.1 | 82.0 | 85.9 | 83.0 | 87.2 | 91.3 |
| Component B: | | | | | | |
| T-5000 | 66.23 | → | → | 63.47 | → | → |
| DETDA | 27.73 | → | → | 26.57 | → | → |
| C-116 | 4.00 | → | → | 8.00 | → | → |
| Q27119 | 1.09 | → | → | 1.04 | → | → |
| L-5304 | 0.95 | → | → | 0.91 | → | → |
| NCO/NH$_2$ Index | 1.00 | 1.05 | 1.10 | 1.00 | 1.05 | 1.10 |
| % Hard Segment | 52.11 | 52.11 | 52.11 | 54.17 | 54.17 | 54.17 |
| Properties | | | | | | |
| Density, gr/cc | 1.07 | 1.07 | 1.07 | 1.04 | 1.04 | 1.03 |
| Hardness, Shore D | 68 | 68 | 68 | 68 | 68 | 68 |
| Tensile (psi) | 4400 | 4400 | 4100 | 4600 | 4400 | 4600 |
| Elongation (%) | 180 | 150 | 100 | 160 | 150 | 100 |
| Die "C" Tear (pli) | 980 | 960 | 910 | 970 | 950 | 900 |
| Heat Sag (in.) | 0.1 | 0.1 | 0.1 | 0.1 | 0.1 | 0.1 |
| Flexural Modulus (psi) | | | | | | |
| −20° F. | 162,436 | 164,099 | 171,905 | 194,000 | 193,063 | 196,005 |
| RT (68° F.) | 78,666 | 81,090 | 83,964 | 87,877 | 87,526 | 99,159 |
| 158° F. | — | — | — | 69,483 | 71,570 | 73,849 |
| % Shrinkage | — | 1.56 | — | — | 1.56 | — |

EXAMPLE 4

Using the same apparatus and procedure described in Example 1 but with the ingredients in the proportions in parts by weight set forth below in Table IV there were prepared five polyurea elastomers in accordance with the present invention (runs 6 to 10).

These polyurea samples were prepared with a wide variation in extender/amine polyether combinations and all at an NCO/NH$_2$ index of 1.04. Zinc stearate was employed as an internal release agent in runs 9 and 10. The polyisocyanate employed in those runs had a much lower free isocyanate content than the Isocyanate I employed above. As the hard segment increases (run 8), i.e. the extender combination increases above the levels set forth in runs 6 and 7, gelation begins to occur before the mold is completely filled. This indirect measure of gelation was discussed in Example 1. As the amount of polyphenylamine is increased up to the 50 percent level of extender combination (runs 9 and 10), the gelation does begin to speed up considerably. However, in spite of rapid gelation the polymer properties are good and as the level of DETDA is decreased the cost of the formulation is greatly reduced.

TABLE IV

| Run | 6 | 7 | 8 | 9 | 10 |
|---|---|---|---|---|---|
| Ingredients (parts by wt.) | | | | | |
| Component A: Isocyanate II[1] | 84.2 | 113 | 143 | 84.6 | 143.3 |
| Component B: | | | | | |
| T-5000 | 78.41 | 69.40 | 60.51 | 77.24 | 58.32 |
| DETDA | 19.56 | 28.12 | 36.56 | 10.88 | 20.34 |
| C-116 | 1.03 | 1.48 | 1.93 | 10.88 | 20.34 |
| L-5304 | 1.00 | 1.00 | 1.00 | 1.00 | 1.00 |
| Zinc Stearate | — | — | — | 1.55 | 1.55 |
| % Hard Segment | 26.4 | 32.7 | 37.4 | 27.1 | 38.3 |
| Properties | | | | | |
| Hardness, Shore D | 52 | 54 | 60 | 44 | 61 |
| Tensile (psi) | 2475 | 3550 | 4110 | 3170 | 3910 |
| Elongation (%) | 170 | 190 | 200 | 235 | 110 |
| Die "C" Tear (pli) | 360 | 510 | 815 | 485 | 625 |
| Flexural Modulus (psi) | | | | | |
| −20° F. | 30,606 | 68,107 | 105,797 | 26,704 | 122,506 |
| RT (68° F.) | 12,875 | 24,570 | 48,825 | 9,000 | 44,725 |
| 158° F. | 10,900 | 19,528 | 40,385 | 5,990 | 35,429 |
| Mold Fill (inches)[2] | 38 | 38 | 32 | 24 | 21 |

Footnotes to Table IV
[1] Isocyanate II: is an isocyanate terminated prepolymer prepared from the reaction of about 50 parts of a liquefied form of 4,4'-methylenebis(phenyl isocyanate) containing carbodiimide groups defined in footnote 1 of Table I with about 50 parts of a 5000 molecular weight polypropyleneoxy-polyethyleneoxy triol; I.E. of Isocyanate II = about 314; free NCO = about 13.3 percent by wt.
[2] Mold Fill: this value in inches is an indirect measure of the gel time of the formulation as it relates to that particular combination of formulations and RIM machine output. The mold being filled is 38 inches long and the value recorded is the length of the mold which is filled in inches before gelation occurs.

EXAMPLE 5

Using the same apparatus and procedure described in Example 1 but with the ingredients in the proportions by weight set forth below in Table V there were prepared four polyurea elastomers in accordance with the present invention (runs 11 to 14).

These elastomers were prepared using the same polyisocyanate described and used in Examples 1 through 3 and all were prepared at an NCO/NH$_2$ of 1.04. Similarly to Example 4, as the hard segment and the proportion of the polyphenylamine both increase to high levels, the gelation time speeds up considerably but polymer properties are maintained.

TABLE V

| Run | 11 | 12 | 13 | 14 |
|---|---|---|---|---|
| Ingredients (parts by wt.) | | | | |
| Component A: Isocyanate I[1] | 54.7 | 56.1 | 71.5 | 92.7 |
| Component B: | | | | |
| T-5000 | 78.41 | 77.91 | 67.78 | 60.51 |
| DETDA | 19.56 | 15.82 | 15.61 | 36.56 |
| C-116 | 1.03 | 6.00 | 15.61 | 1.93 |
| L-5304 | 1.00 | 1.00 | 1.00 | 1.00 |
| Zinc Stearate | — | 1.55 | 1.55 | — |
| % Hard Segment | 39.4 | 40.8 | 50.9 | 58.1 |
| Properties | | | | |
| Hardness, Shore D | 54.5 | 51 | 57.5 | 71 |
| Tensile (psi) | 3515 | 3400 | 3510 | 4780 |
| Elongation (%) | 215 | 300 | 320 | 100 |
| Die "C" Tear (pli) | 575 | 555 | 690 | 575 |
| Flexural Modulus (psi) | | | | |
| −20° F. | 79,400 | 55,528 | 134,709 | 195,019 |
| RT (68° F.) | 26,345 | 22,050 | 40,950 | 103,040 |
| 158° F. | 20,700 | 17,380 | 31,883 | 82,193 |
| Mold Fill (inches) | 29.0 | 23.0 | 15.5 | 23.5 |

Footnote to Table V
[1]Isocyanate I: the same isocyanate described in footnote 1 of Table I.

EXAMPLE 6

Using the same apparatus and procedure described in Example 1 but with the ingredients in the proportions by weight set forth below in Table VI there were prepared five polyurea elastomers in accordance with the present invention (runs 15 to 19).

All of the elastomers were prepared at an NCO/NH$_2$ of 1.04 and using a polyisocyanate having a lower isocyanate equivalent weight compared with the previous runs. The wide range in hardness and flexural modulus properties which can be obtained by varying the total amount of the aromatic amine extender combination and the components within this combination can be observed in the data set forth in Table VI. Similarly to Examples 4 and 5, gelation speeds up with increase in hard segment and concentration of polyphenylamine to high levels but polymer properties are maintained.

TABLE VI

| Run | 15 | 16 | 17 | 18 | 19 |
|---|---|---|---|---|---|
| Ingredients (parts by wt.) | | | | | |
| Component A: Isocyanate III[1] | 49.8 | 49.1 | 66.3 | 83.4 | 83.2 |
| Component B: | | | | | |
| T-5000 | 78.41 | 77.24 | 68.74 | 60.51 | 58.32 |
| DETDA | 19.56 | 10.88 | 22.70 | 36.56 | 20.34 |
| C-116 | 1.03 | 10.88 | 7.56 | 1.93 | 20.34 |
| L-5304 | 1.00 | 1.00 | 1.00 | 1.00 | 1.00 |
| Zinc Stearate | — | 1.55 | 1.55 | — | 1.55 |
| % Hard Segment | 32.9 | 33.8 | 42.8 | 50.0 | 51.3 |
| Properties | | | | | |
| Hardness, Shore D | 53 | 50 | 62 | 69 | 70 |
| Tensile (psi) | 3960 | 3800 | 4260 | 4460 | 4890 |
| Elongation (%) | 240 | 235 | 190 | 100 | 65 |
| Die "C" Tear (pli) | 450 | 585 | 710 | 975 | 840 |
| Flexural Modulus (psi) | | | | | |
| −20° F. | 55,008 | 41,983 | 99,345 | 155,274 | 157,069 |
| RT (68° F.) | 22,425 | 14,520 | 50,470 | 89,100 | 73,480 |
| 158° F. | 19,246 | 11,777 | 40,204 | 71,650 | 62,832 |
| Mold Fill (inches) | 32.0 | 20.0 | 21.0 | 21.0 | 15.5 |

Footnote to Table VI
[1]Isocyanate III: is a blend in the proportions by weight of (1) about 52.8 parts of the liquefied form of 4,4'-methylenebis(phenyl isocyanate) described in footnote 1 of Table I; and (2) an isocyanate terminated prepolymer prepared from the reaction of 25 parts of a methylenebis(phenyl isocyanate) having about 11% by wt. of o,p' content with 22 parts of a 5000 molecular weight polypropyleneoxy-polyethyleneoxy triol having about 18% by wt. E.O. content and about 85% primary hydroxyl groups (OH EW = about 1626); I.E. of Isocyanate III = about 180; free NCO content = of the blend about 23 percent by weight.

FORMULA CHART

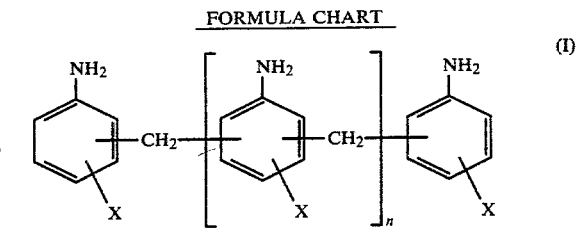

(I)

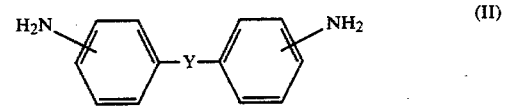

(II)

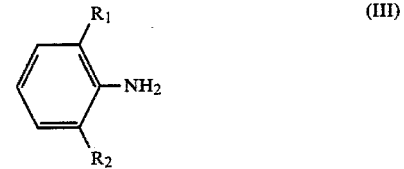

(III)

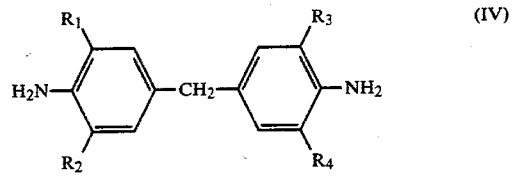

(IV)

We claim:

1. In a reaction injection molded polyurea elastomer prepared by the reaction of an aromatic polyisocyanate, an amine terminated polyether and an aromatic diamine extender wherein at least one of the positions ortho to each amine group of said diamine is substituted by a lower alkyl group, the improvement which comprises employing an aromatic amine extender combination comprising (a) from about 99 to about 50 percent by weight of said aromatic diamine and (b) from about 1 to about 50 percent by weight of a polymethylene polyphenylamine having the formula

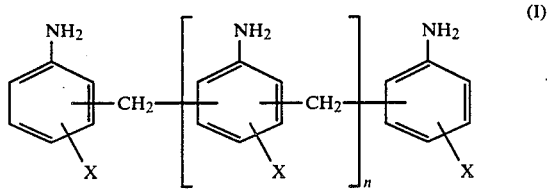

wherein n has an average value of from about 0.1 to about 0.7, and X is selected from the group consisting of hydrogen, halogen, and lower-alkyl.

2. A polyurea elastomer according to claim 1 wherein X in formula (I) is hydrogen and n has an average value of from about 0.25 to about 0.35.

3. A polyurea elastomer according to claim 1 wherein said aromatic diamine extender is selected from the group consisting of 1-methyl-3,5-diethyl-2,4-diaminobenzene, 1-methyl-3,5-diethyl-2,6-diaminobenzene, and mixtures thereof in varying proportions, 1,3,5-triethyl-2,4-diaminobenzene, 3,3',5,5'-tetraisopropyl-4,4'-diaminodiphenylmethane, and tertiary-butylbenzenediamine.

4. A polyurea elastomer according to claim 1 wherein said amine terminated polyether comprises a primary or secondary amine terminated polyether having an amine functionality of about 2 to about 4 and a number average molecular weight greater than 1500.

5. A polyurea elastomer according to claim 1 wherein the aromatic amine extender combination is present in an amount of from about 20 to about 45 percent by weight based on the combined weight of said amine terminated polyether and said aromatic amine extender combination.

6. A polyurea elastomer according to claim 1 wherein the ratio of isocyanate equivalents to the total active hydrogen equivalents of said extender combination and said amine terminated polyether is from about 0.95 to about 1.15.

7. A polyurea elastomer according to claim 1 wherein said aromatic polyisocyanate is selected from the group consisting of (a) an isocyanate terminated prepolymer having an isocyanate content of about 9 to about 20 percent by weight and prepared from methylenebis(phenyl isocyanate), (b) a liquefied form of 4,4'-methylenebis(phenyl isocyanate), and mixtures of (a) and (b).

8. A polyurea elastomer according to claim 1 wherein the reaction ingredients are injected into a mold which is maintained at a temperature of from about 80° C. to about 250° C.

9. A reaction injection molded polyurea elastomer comprising the product of the reaction of:
(1) an aromatic polyisocyanate selected from the group consisting of (a) an isocyanate terminated prepolymer having an isocyanate content of about 9 to about 20 percent by weight and prepared from methylenebis(phenyl isocyanate), (b) a liquefied form of 4,4'-methylenebis(phenyl isocyanate), and mixtures of (a) and (b);
(2) a primary or secondary amine terminated polyether having a molecular weight greater than 1500 and having an amine functionality of about 2 to about 4; and
(3) an aromatic amine extender combination comprising:
(a) from about 99 to about 50 percent by weight of 1-methyl-3,5-diethyl-2,4-diaminobenzene, 1-methyl-3,5-diethyl-2,6-diaminobenzene, or mixtures thereof in varying proportions; and
(b) from about 1 to about 50 percent by weight of a polymethylene polyphenylamine having the formula

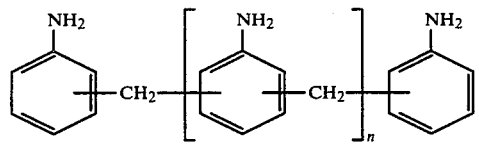

wherein n has an average value of from about 0.25 to about 0.35,
wherein said amine extender combination is present in an amount of from about 20 to about 45 percent by weight based on the combined weight of (2) and (3) and the ratio of isocyanate equivalents to the total active hydrogen equivalents of (2) and (3) is from about 0.95 to about 1.15.

10. A polyurea elastomer according to claim 9 wherein said amine terminated polyether has a primary amine functionality of about 3 and a molecular weight of about 5000.

11. An aromatic amine combination particularly adapted for use as an extender in the reaction injection molding of polyurea elastomers said combination comprising:
(a) from about 99 to about 50 percent by weight of an aromatic diamine wherein at least one of the positions ortho to each amine group is substituted by a lower alkyl group; and
(b) from about 1 to about 50 percent by weight of a polymethylene polyphenylamine having the formula

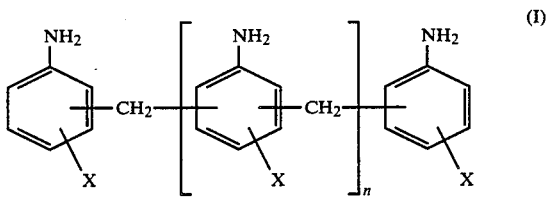

wherein n has an average value of from about 0.1 to about 0.7 and X is selected from the group consisting of hydrogen, halogen, and lower-alkyl.

12. An aromatic amine combination according to claim 11, wherein (a) is selected from the group consisting of 1-methyl-3,5-diethyl-2,4-diaminobenzene, 1-methyl-3,5-diethyl-2,6-diaminobenzene, and mixtures thereof in varying proportions, 1,3,5-triethyl-2,4-diaminobenzene, 3,3',5,5'-tetraisopropyl-4,4'-diaminodiphenylmethane, and tertiary-butylbenzenediamine; and (b) has the formula (I) wherein X is hydrogen and n has an average value of from about 0.25 to about 0.35.

13. An aromatic amine combination according to claim 12 wherein (a) comprises 1-methyl-3,5-diethyl-2,4-diaminobenzene, 1-methyl-3,5-diethyl-2,6-diaminobenzene, or mixtures thereof in varying proportions.

14. A polyamine blend particularly adapted for use in the reaction injection molding of polyurea elastomers said blend comprising:
(i) a primary or secondary amine terminated polyether having a molecular weight greater than 1500 and an amine functionality of from about 2 to about 6; and (ii) an aromatic amine combination according to claim 11.

15. A polyamine blend according to claim 14 comprising:
(i) a primary amine terminated polyether having an amine functionality of about 3 and molecular weight of about 5000; and
(ii) an aromatic amine combination comprising
  (a) an aromatic diamine selected from the group consisting of 1-methyl-3,5-diethyl-2,4-diaminobenzene, 1-methyl-3,5-diethyl-2,6-diaminobenzene, and mixtures thereof in varying proportions, 1,3,5-triethyl-2,4-diaminobenzene, 3,3′,5,5′-tetraisopropyl-4,4′-diaminodiphenylmethane, and tertiary butylbenzenediamine; and
  (b) a polymethylene polyphenylamine having formula (I) wherein X is hydrogen and n has an average value of from about 0.25 to about 0.35.

16. A polyamine blend according to claim 14 comprising
(i) from about 80 to about 55 percent by weight of a primary amine terminated polyether having an amine functionality of about 3 and molecular weight of about 5000; and
(ii) from about 20 to about 45 percent by weight of an aromatic amine combination comprising
  (a) from about 99 to about 50 percent by weight of 1-methyl-3,5-diethyl-2,4-diaminobenzene, 1-methyl-3,5-diethyl-2,6-diaminobenzene, or mixtures thereof in varying proportions; and
  (b) from about 1 to about 50 percent by weight of the polymethylene polyphenylamine having formula (I) wherein X is hydrogen and n has an average value of from about 0.25 to about 0.35.

* * * * *